June 22, 1937.    R. BUSSIEN    2,084,429
STEERING WHEEL DRIVE FOR POWER VEHICLES
Filed Nov. 27, 1935
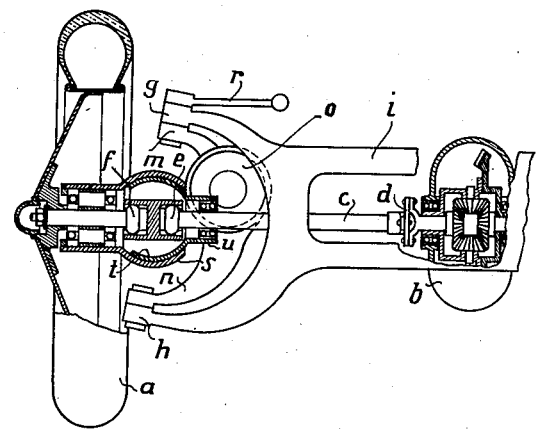
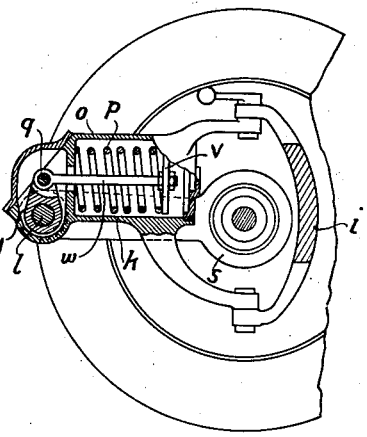
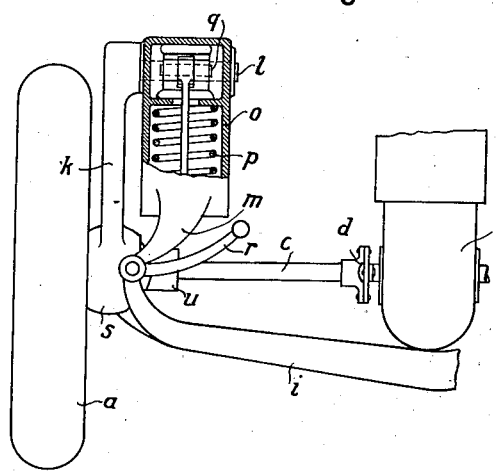
Inventor:
Richard Bussien
By
Emil Bönnelycke
Attorney Patented June 22, 1937

2,084,429

UNITED STATES PATENT OFFICE 2,084,429

STEERING-WHEEL DRIVE FOR POWER VEHICLES

Richard Bussien, Cologne, Germany, assignor to Voran Automobilbau-Aktiengesellschaft, Berlin-Oberschoneweide, Germany Application November 27, 1935, Serial No. 51,940
In Germany December 20, 1934

2 Claims. (Cl. 180—43)

This invention relates to a steering-wheel drive for power vehicles, the wheels of which are suspended elastically and independently from each other, and which have oscillating, preferably three jointed driving shafts. The invention consists therein that the steering swivel-journals of each driven wheel are supported in the vehicle frame and the driving wheel is carried by a rocking lever suported resiliently relatively to the swivel-journals and extending in the direction of the vehicle, so that the rocking lever and the springs take part in the steering but when the vehicle runs over unevennesses only said lever oscillates upwardly and downwardly, whereas the steering rods remain at rest.

In this improved constructional form the rocking lever is at its free end where it supports the wheel designed as a hollow ball in which a bearing supporting the driving shaft can adjust itself with the aid of a hollow ball-shaped member attached to said bearing. The two interengaging hollow ball-shaped parts constitute a casing for the shaft joints arranged in the proximity of the swivel-journal.

The invention is illustrated diagrammatically and by way of example on the accompanying drawing on which Figure 1 shows partly in front-view and partly in vertical section one half of a front axle of a steering-wheel drive designed according to this invention, Figure 2 is a plan of the same arrangement and combination of parts, partly in horizontal section, and Figure 3 shows a side-view, all as fully described hereinafter.

The drawing shows only one half of an axle, naturally the other half being constructed in the same manner. Therefore it will be sufficient for the purpose of the present application to describe only the one half part.

In the drawing $a$ denotes the steering wheel which is driven by the differential gearing $b$ by the intermediary of the shaft $c$, into which the three joints $d$, $e$ and $f$ are inserted. The joint $d$ is located in the proximity of the differential gearing $b$ and enables the steering wheel to swing upwardly and downwardly when the vehicle runs over unevennesses, whereas the joint $e$ is arranged at the one side and the joint $f$ at the other side of the axis extending through the swivel-journals $g$ and $h$, and become active especially at an oblique position of the wheel when they divide the angle of obliquity. The swivel-journals $g$ and $h$ are located in the vehicle frame $i$. The steering wheel $a$ is carried by a rocking lever $k$ which extends parallel to the longitudinal direction of the vehicle and is supported elastically relatively to the swivel-journals $g$ and $h$.

For this purpose the rocking lever $k$ with its shaft $l$ are supported in a casing $o$ provided with extensions or arms $m$ and $n$ by means of which said casing is pivotally connected with the journals $g$ and $h$. The shaft $l$ is rigidly connected with the lever $k$. In the casing there is, furthermore, provided a spring $p_1$ which abuts with its one end against an intermediate wall of the casing $o$ and with its other end against a disk $v$ fastened at the end of a rod $w$, the other end of which is pivoted by means of journal $q$ to an arm $y$ rigidly attached to the shaft $l$. When the wheel swings upwardly and downwardly, therefore, said spring $p$ is expanded or compressed. Owing to this arrangement the steering rod $r$ connected with the arm $m$ remains completely at rest when the wheel springs, and is not subjected to any strain if no obliquity of the wheels takes place.

The rocking lever $k$ is at the end carrying the steering wheel designed as a hollow ball, in the interior of which a second hollow ball $t$ attached to a cylindrical bearing $u$ supporting the three-jointed shaft $c$ can adjust itself when the wheel swings upwardly and downwardly. The two hollow balls together constitute at the same time a casing for the two exterior joints $f$ and $e$.

I claim:—

1. A steering-wheel drive for power driven vehicles the wheels of which are suspended elastically and independently from each other, and which have oscillating, preferably three-jointed driving shafts, comprising, in combination with the vehicle frame and the three-jointed driving shaft, a driven steering wheel, swivel-journals for said wheel supported in the vehicle frame, a rocking lever carying said wheel and extending in the longitudinal direction of the vehicle, means supporting said lever elastically relative to said journals, said lever and supporting means taking part in the steering movement of the steering wheel and the lever being capable of rocking upwardly and downwardly when the vehicle is running over uneven surfaces, a hollow ball at the end of the rocking lever carrying the steering wheel, a bearing supporting the jointed driving shaft adjustably in said hollow ball, and another hollow ball-shaped member attached to said bearing and constituting the means for permitting said adjustment, two of the joints of the drive shaft being disposed in the hollow ball-shaped members.

2. A steering-wheel drive according to claim 1, in which the two hollow members together form a casing for the two shaft joints located in the proximity of the swivel-journals.

RICHARD BUSSIEN.